Patented Nov. 12, 1946

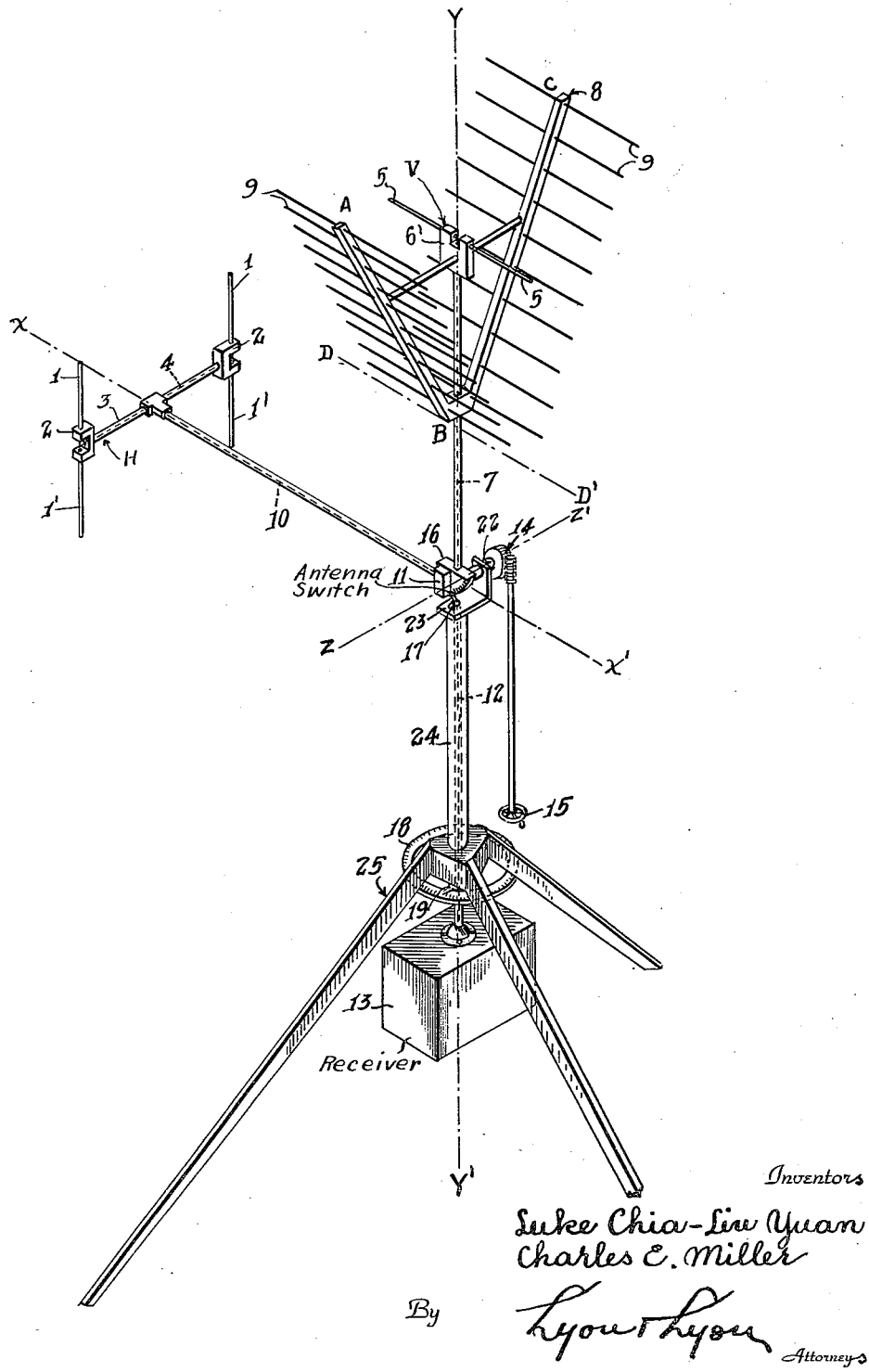

2,410,917

UNITED STATES PATENT OFFICE 2,410,917

SHORT WAVE DIRECTION FINDER

Luke Chia-Liu Yuan, Pasadena, and Charles E. Miller, Glendale, Calif., assignors to California Institute Research Foundation, Pasadena, Calif., a corporation of California Application October 31, 1941, Serial No. 417,280

4 Claims. (Cl. 250—11)

This invention relates to a radio antenna apparatus especially adapted for the determination of the directional reception of short wave radio signals, particularly radio signals of frequencies in the region of about 50 to 500 megacycles.

It is a general object of the present invention to provide an antenna system capable of determining the direction between the antenna system and the transmitter of a radio wave, said direction being defined in two dimensions, namely, its projection on both horizontal and vertical planes.

In order that an antenna system can measure the true direction between a transmitter and a receiving antenna system, it is necessary that the receiving antenna system shall be affected only by the direct radiation between the transmitter and receiving antenna system and be unaffected by other reflected or refracted radiations.

It is, therefore, an object of the present invention to provide an antenna system for measuring the direction of an incident radio wave in two dimensions, which antenna system is responsive only to the direct radiation between the transmitter and receiving antenna and is unresponsive to reflected or refracted rays.

One of the principal fields of utility of the antenna system of the present invention is in determining the direction between the receiving antenna system and a radio transmitter carried by a balloon. In the determination of weather conditions it is customary to liberate balloons carrying temperature and pressure indicating instruments which are connected to a radio transmitter for transmitting continuously the temperature and pressure measurements made by the instruments carried by the balloon. For these temperature and pressure measurements to be of value it is necessary that the absolute position of the ballon in space be known at all times. Frequently, it is desirable to make such determinations under conditions where a direct visual determination of the position of the balloon is impossible. By means of the apparatus of the present invention, it is possible to continuously determine the direction between the radio transmitter carried by such a balloon and the receiving antenna of the present invention, after which the absolute position of the balloon in space may be readily calculated from the altitude of the balloon as known from the transmitted signals from the balloon.

In order to carry out the objects of the present invention, it is essential to provide an antenna receiving system of simple design and capable of rapid manipulation for determination of both the horizontal and vertical components of the incoming radio wave, which determinations should be necessarily simultaneously made, or at least made within an interval of time of a few seconds. It is, therefore, an object of the present invention to provide a simple antenna structure capable of rapid operation and operative to determine simultaneously or substantially simultaneously both the horizontal and vertical components of the direction of an incoming radio wave.

The apparatus of the present invention, together with various additional objects and advantages of the invention, will be more readily understood from a description of a preferred form or example of an apparatus embodying the invention, and for this purpose we have hereafter described, in connection with the accompanying drawing, such preferred form or example of the invention.

In the drawing the figure is a simplified perspective view of the direction finder.

Referring to the drawing, it will be appreciated by those skilled in the art that the accuracy of the results to be attained will be dependent upon the correct alignment of the various elements of the antenna system, and that the value of the system depends upon good mechanical design requiring the various elements to possess high mechanical rigidity and stability. In the drawing, the antenna system is illustrated as comprising a directive antenna H designed for the purpose of determining the horizontal angle of incidence or azimuth of the incoming wave and a directive antenna V for determining the vertical angle of incidence of the incoming wave. The directional antenna H is preferably of the Adcock type. It is shown as consisting of two spaced apart vertical antennas, each comprising an element I and an element I'. The elements I and I' are preferably each one-quarter wave length in length, and for mechanical rigidity are formed of silver supporting rods, of Duralumin, or other suitable material. In each of the vertical antenna components of the Adcock system the rods I and I' are coaxially supported with their adjacent ends spaced about I centimeter apart by insulating supports 2, which are in turn supported by a tubular spacer 3 so as to maintain the rods I and I' in a plane normal to the axis X—X' with the rods I and I' of the two vertical antenna components parallel to each other and preferably spaced one-half wave length apart. The rods I and I' of the vertical antenna components of the system are connected together, and similarly the rods 1 and 1' are connected together by the line 4. Thereby the voltages introduced in the horizontal line 4 balance out each other's effect, so that horizontally polarized downcoming waves do not affect the system. The directional antenna V includes rods 5, each one-quarter wave length in length and coaxially supported by the insulator 6. The rods 5 together constitute a dipole antenna which feeds the line 7. The dipole 5—5 is provided with a shield 8 in order that said antenna may be used for determining the vertical angle of incidence of the incoming wave. While the shield 8 may be of various types, sizes, or configurations, it should shield the dipole from reflected waves without impairing the receptive and directional characteristics of the dipole in its reception of the direct wave from the transmitter.

We have discovered that a shield of the type known as the corner reflection type is suited to my purpose. Such a shield is preferably constructed using rods or wires 9, each approximately 0.6 wave length in length, and supported so as to be mutually parallel and at the same time parallel with the dipole 5—5. The rods or wires 5 are arranged in two planes whose intersection is the line D—D'. The inclined angle A, B, C between the planes is approximately 60°. The dipole 5—5 lies in a plane which bisects the angle A, B, C at a distance preferably slightly greater than one-half wave length from the line D—D' and parallel thereto. The rods 9 should be spaced not more than about 0.1 wave length, but the spacing used is not very critical. The two antennas H and V are connected, respectively, with feed lines 10 and 7 to a double pole double throw switch 11 of suitable design for the frequencies employed, permitting connection at will of either antenna to the line 12 which feeds a receiver 13. The line 10 should be connected to the electrical midpoint, which will also be the geometrical midpoint if the system is carefully constructed, of the line 4. The lines 4, 7, 10 and 12 may be of any type and construction dictated by good engineering practice.

We have found lines constructed as follows to be suitable: The lines are formed from a twisted pair of fiber glass insulated No. 18 flexible wires threaded through ceramic beads and enclosed within ½" copper tubing, which tubing shields the lines from stray signal pick-up. The tubing should be thoroughly bonded at all joints.

The two antenna systems H and V are so mounted as to be rigidly held in fixed positions relative to each other and together constitute a single combined directional antenna assembly. The axes X—X', Y—Y', and Z—Z' intersect at angles of 90° each with the other. The dipole 5—5 is maintained always parallel to the axis X—X'. The lines 7, 10, and 12 each preferably have a length of one wave length or suitable multiple thereof. The antenna systems H and V are suitably supported by the block 16 to be capable of being rotated together about the axis Z—Z'. For this purpose, the block 16 is indicated as mounted upon a shaft 22 rotatably supported in a bracket 23 and connected by gearing 14 to a hand wheel 15.

For rotation of the assembly about the axis Y—Y' the bracket 23 is indicated as mounted on the tube 24, which is rotatably supported by a tripod 25, so that the entire assembly may be rotated with respect to the supporting tripod. It is obvious that mechanical means, not shown, may be added for controlling the rotation, if desired.

Indicating means are provided for indicating the extent of rotation of the system with respect to both the Y—Y' axis and the Z—Z' axis. For this purpose, the block 16 is indicated as having a graduated quadrant cooperating with a fixed pointer 17 carried by the bracket 23, and the tube 24 is indicated as mounted below the tripod, a pointer 19 cooperating with the graduated circle 18 affixed to the tripod 25. The receiver 13 is indicated as supported by the rod 24 so as to be likewise rotated therewith.

The receiver 13 may be of any usual or preferred design, preferably being designed for suitable null point reception of signals of the desired frequency. Thus, for example, a superheterodyne receiver with a meter in the output circuit to indicate the signal intensity is satisfactory for the purpose intended. The receiver should be well shielded to eliminate stray pick-up. By mounting the receiver 13 on the tubular support 24 connected to rotate with the assembly, definite advantages result, since it makes better shielding possible and eliminates the possibility of the characteristics of the transmission line 12 being altered by rotation of the assembly. The receiver may be powered by batteries self-contained within the receiver case.

In the operation of the apparatus of the present invention the assembly is first rotated with respect to the Y—Y' axis with the Adcock antenna H connected to the receiver until a null point indication is obtained, at which time the X—X' axis of the antenna system will be in the vertical plane connecting the transmitter and receiving antenna assembly. The assembly is then rotated by the hand-wheel 15 with respect to the Z—Z' axis to secure a null point reading, at which time the axis of the dipole 5—5 is in the vertical plane passing through the transmitter and receiving antenna.

With the apparatus of the present invention it has been found possible in practice to accurately follow the flight of a balloon carrying a radio transmitter so as to determine in connection with the height of said balloon its absolute position in space.

While the particular form of the apparatus herein described is well adapted to carry out the objects of the present invention, it is to be understood that various modifications may be made and the invention includes all such modifications and changes as come within the scope of the appended claims.

We claim:

1. A directional antenna system effective for the determination of both the horizontal and vertical angles of incidence of an incoming wave, comprising an Adcock antenna arranged for the determination of the horizontal angle of incidence, a tube for rigidly supporting said Adcock antenna and housing and shielding feed lines thereto, a vertically extending tube rigidly supported at a right angle to said first-mentioned tube, a dipole antenna supported by said second-mentioned tube and having a feed line housed therein and shielded thereby, said dipole antenna having its axis parallel to the axis of said first-mentioned tube, a corner reflection shield for said dipole antenna with the elements of said shield parallel to said dipole antenna, means for mounting both antennae for simultaneous rotation about a vertical axis, means for mounting said antennae for simultaneous rotation about an axis perpendicular with both said tubes, and means for indicating said angles of rotation.

2. A directional antenna system, comprising two tubular supporting members mounted at right angles to each other and connected to a common point for rotation of the tubes simultaneously about a horizontal axis perpendicular to the axis of both tubes, means for rotating the two tubes about a vertical axis, means for indicating both angles of rotation, a directive antenna connected with one tube for the determination of the horizontal angle of incidence, a directive antenna connected with the other tube for determination of the vertical angle of incidence, a corner reflection shield for said last-mentioned antenna with its elements parallel to the antenna elements of said second-mentioned directive antenna and also parallel with said first-mentioned tube, and feed lines for said antennae passing through said respective supporting tubes.

3. A directional antenna system, comprising a directive antenna of the Adcock type, a supporting member for said Adcock antenna housing the feed lines thereto, a directive antenna for the determination of the vertical angle of incidence having its elements parallel to said supporting member, a supporting member for said last-mentioned antenna rigidly held at right angles with respect to said first-mentioned supporting member and housing the feed lines to said second-mentioned directive antenna, a corner reflection shield for said second-mentioned antenna, means for simultaneously rotating both directive antennae with respect to either a vertical axis or a horizontal axis, and means for indicating the angle of rotation.

4. A directional antenna system, comprising two supporting members extending at right angles to each other and connected to a common point for rotation of the members simultaneously about a horizontal axis perpendicular to the axes of said members, means for rotating the two members about a vertical axis, means for indicating both angles of rotation, a directive antenna connected with one member for the determination of the horizontal angle of incidence, and a directive antenna connected with the other member for the determination of the vertical angle of incidence, a reflection shield for said last-mentioned antenna, and feed lines for said antennae passing through said respective supporting members.

LUKE CHIA-LIU YUAN.
CHARLES E. MILLER.